US006986074B2

(12) United States Patent
Alia et al.

(10) Patent No.: US 6,986,074 B2
(45) Date of Patent: Jan. 10, 2006

(54) INTEGRATED CIRCUIT SELECTIVE POWER DOWN PROTOCOL BASED ON ACKNOWLEDGEMENT

(75) Inventors: Michele Alia, Giarre (IT); Michele Carrano, Valverde (IT); Carmelo Pistritto, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 510 days.

(21) Appl. No.: 10/010,738

(22) Filed: Nov. 5, 2001

(65) Prior Publication Data

US 2002/0152407 A1 Oct. 17, 2002

(30) Foreign Application Priority Data

Nov. 3, 2000 (EP) .................................. 00830731

(51) Int. Cl.
*G06F 1/04* (2006.01)
(52) U.S. Cl. ...................................... 713/601; 713/320
(58) Field of Classification Search ................ 713/320, 713/601
See application file for complete search history.

(56) References Cited

U.S. PATENT DOCUMENTS

| 5,585,745 | A | * | 12/1996 | Simmons et al. ............. 326/93 |
|---|---|---|---|---|
| 5,586,307 | A | | 12/1996 | Wong et al. ................. 395/551 |
| 5,615,376 | A | | 3/1997 | Ranganathan ................ 395/750 |
| 5,677,849 | A | * | 10/1997 | Smith .......................... 713/300 |
| 5,768,213 | A | * | 6/1998 | Jung et al. ................... 365/233 |
| 5,901,322 | A | * | 5/1999 | Herbst et al. ................ 713/322 |
| 5,913,068 | A | * | 6/1999 | Matoba ........................ 713/322 |
| 6,088,806 | A | | 7/2000 | Chee ........................... 713/322 |
| 6,342,795 | B1 | * | 1/2002 | Ohta ............................. 327/99 |
| 6,633,987 | B2 | * | 10/2003 | Jain et al. .................... 713/300 |
| 6,674,821 | B1 | * | 1/2004 | Mejyr .......................... 375/354 |
| 6,675,305 | B1 | * | 1/2004 | Mohammad ................ 713/322 |

* cited by examiner

*Primary Examiner*—Lynne H. Browne
*Assistant Examiner*—Tse Chen
(74) *Attorney, Agent, or Firm*—Lisa K. Jorgenson; Allen, Dyer, Doppelt, Milbrath & Gilchrist, P.A.

(57) ABSTRACT

A system-on-chip (SOC) includes a power down circuit. Within the SOC are several circuit blocks, each of them operating responsive to a local clock signal. A system clock is coupled to the circuit blocks for providing a system clock signal that functions as the local clock signal for selected circuit blocks. A power control manager provides a signal that at least partially determines whether the system clock will act as the local clock for some of the circuit blocks. Within the circuit blocks is a shutdown circuit that selectively prevents the system clock signal from functioning as the local clock signal in those circuit blocks that receive the shutdown signal, but the shutdown circuit only operates after both the signal to shutdown is received from the power control manager and after the circuit block has, in fact, shutdown.

13 Claims, 5 Drawing Sheets

INTEGRATED CIRCUIT SELECTIVE POWER DOWN PROTOCOL BASED ON ACKNOWLEDGEMENT

FIELD OF THE INVENTION

The present invention is directed to integrated circuits, and more particularly, to a power down circuit for reducing power consumption in a system-on-chip (SOC) comprising a plurality of circuit blocks by switching off the system clock to selected circuit blocks that are temporarily unnecessary.

BACKGROUND OF THE INVENTION

Current trends in integrated circuit designs call for creating an entire manufactured circuit system on a single chip. Such a system is termed system-on-chip or SOC. This differs from simple circuit integration in that many different types of circuits can be included on a single chip. For example, an SOC could include a computer processor, various signal processors, a large amount of memory, various clocks, power down circuits, and necessary system controllers all integrated on a single piece of silicon or integrated into a single package. This level of integration was not previously possible with prior integration techniques, and is very advantageous because useful devices can be created in very small sizes.

FIG. 1 is a block diagram showing an SOC 10a The SOC 10a is formed of a number of different integrated circuit portions (IPs) or blocks 12, 14, ..., 20. Each IP block 12–20 is connected to a system clock 30. The system clock 30 distributes a system clock signal to each of the IP blocks 12–20.

Important examples of devices that can include SOCs are cellular phones, palmtops, notebooks, computer components, movable equipment, communication apparatuses, biomedical apparatuses, digital cameras, MP3 players, etc. Such applications generally require a battery or some sort of power supply, which typically presents cost, duration, weight and dimension issues. To increase the longevity of the power supplies for these devices, and especially for portable devices which require a portable power source, power consumption of the SOCs must be reduced from their current levels.

Dynamic power consumption of the different circuits blocks 12–20 integrated on a single SOC 10a is given by the formula $P=f*C*v*2$, where P is power, f is operating frequency of a circuit block, C is capacitance of all of the gates of the circuit block, and v is the power supply voltage. Therefore, in addition to reducing the power supply voltage and the overall capacitance, power of the SOC 10a may be conserved by reducing the operating frequency of the different circuit blocks 12–20. One way to implement this is to temporarily switch off the system clock for some of the IP blocks 12–20 of the SOC 10a that are not necessary for immediate functions. Because not all of the IP blocks 12–20 necessarily operate at the same time in the SOC 10a, some of them are unused and are eligible to be shutdown.

FIG. 2 shows an SOC 10b that is similar to the SOC 10a of FIG. 1, but additionally includes a power control manager 40. The power control manager 40 controls a bank of switches 42 that are coupled between the system clock 30 and the various IP blocks 12–20. When the power control manager 40 determines that particular IP blocks should be shutdown, such as circuit blocks 14 and 16, for example, a signal is generated and fed to the bank of switches 42. The bank of switches 42 then controls the particular switch coupled to the selected IP blocks, in this example IP blocks 14 and 16, and disconnects them from the system clock 30. When the selected IP blocks 14, 16 do not receive the system clock 30, they stop functioning and, based upon the above equation, do not draw any power because the operating frequency of the circuit is brought to zero.

Although the idea of separating the system clock from the various IP blocks is compelling, most SOCs cannot be controlled in such a manner. The implementation of such a system as shown in FIG. 2 causes problems. As described above, many different types of IP blocks are contained within a particular SOC, and each of these IP blocks have unique requirements for when they can be safely shutdown.

It can therefore be difficult to establish an exact time when it is possible to switch off the clock to an IP block without causing errors. In some cases, if the clock to the IP block is stopped abruptly, there is a risk of preventing a critical operation of the block from being carried out. For example, an IP block could be performing a necessary communication protocol and the shutdown of the block could cause the SOC to disregard the protocol. Examples of protocols that could easily be disregarded include memory-DMA, and master-slave blocks among others. Additionally, removing a system clock from a counter or a timing signal generator could be fatal to that particular IP block.

Some of these problems are illustrated in FIG. 3, which shows an SOC 10c that has prevented the system clock 30 from reaching the IP blocks 14, 16 and 18, while continuing to supply the IP blocks 12 and 20. In each of the cases of the non-supplied blocks 14, 16, 18, there are potential problems. For instance, the IP block 14 may be in the middle of a memory-DMA protocol operation with a memory unit 24, and its abrupt halt may violate that protocol. Similarly, the IP block 16 may be communicating with a slave peripheral 26, and an abrupt halt may cause a malfunction or protocol violation. Additionally, the IP block 18 may include counters which rely on the system clock 30 for accuracy. Separating the system clock 30 from the IP block 18 could seriously degrade such accuracy.

SUMMARY OF THE INVENTION

In view of the foregoing background, an object of the invention is to accurately control the shutdown of multiple and different types of circuits blocks that are integrated into a single system to preserve the necessary function of the circuit blocks.

This and other objects, advantages and features according to the invention are provided by switching off the system clock for portions of the circuit blocks that are temporarily unnecessary. Specifically, this invention involves a power down circuit for use in a system-on-chip comprising a plurality of circuit blocks each operating based upon a local clock signal. A system clock is coupled to one or more of the circuit blocks and provides a system clock signal that functions as the local clock signal of selected ones of the plurality of circuit blocks. A power control manager is coupled to the plurality of circuit blocks and provides a signal that at least partially determines whether the respective system clock signals will function as the local clock signals for the corresponding plurality of circuit blocks.

More particularly, a communication protocol causes selected IP blocks to receive a shutdown signal from the power control manager. The selected IP blocks then complete their current activity and, on completion, switch off their internal clock and send an acknowledging signal back to the power control manager. The shutdown signal is removed when the power control manager desires the IP blocks to restart, and the IP blocks send back an acknowledgment signal of the restart.

One aspect of the invention is directed to a system-onchip (SOC) comprising a plurality of circuit blocks, each responsive to a respective local clock signal. A system clock is connected to the circuit blocks for providing a system clock signal thereto for functioning as the respective local clock signals.

A power control manager is connected to the circuit blocks for selectively providing a shutdown signal thereto. Each circuit block comprises a shutdown circuit for preventing the system clock signal from functioning as the respective local clock signal after the circuit block provides a shutdown acknowledgment signal to the power control manager.

Another aspect of the invention is directed to a method for powering down circuit blocks within a system-on-chip (SOC) comprising a plurality of circuit blocks. The method comprises providing a system clock signal to the circuit blocks for functioning as a respective local clock signal, selectively providing a shutdown signal to the circuit blocks, and preventing the system clock signal from functioning as the local clock signal after the circuit block receiving the shutdown signal provides a shutdown acknowledgment signal.

BRIEF DESCRIPTION OF THE DRAWINGS

The features and advantages of the apparatus and method to power down selected circuit blocks within a system-on-chip according to the invention will be apparent by reading the following description of a preferred embodiment thereof, given by way of non-limiting examples with reference to the accompanying drawings.

DETAILED DESCRIPTION OF THE PREFERRED EMBODIMENTS

Figure 1:
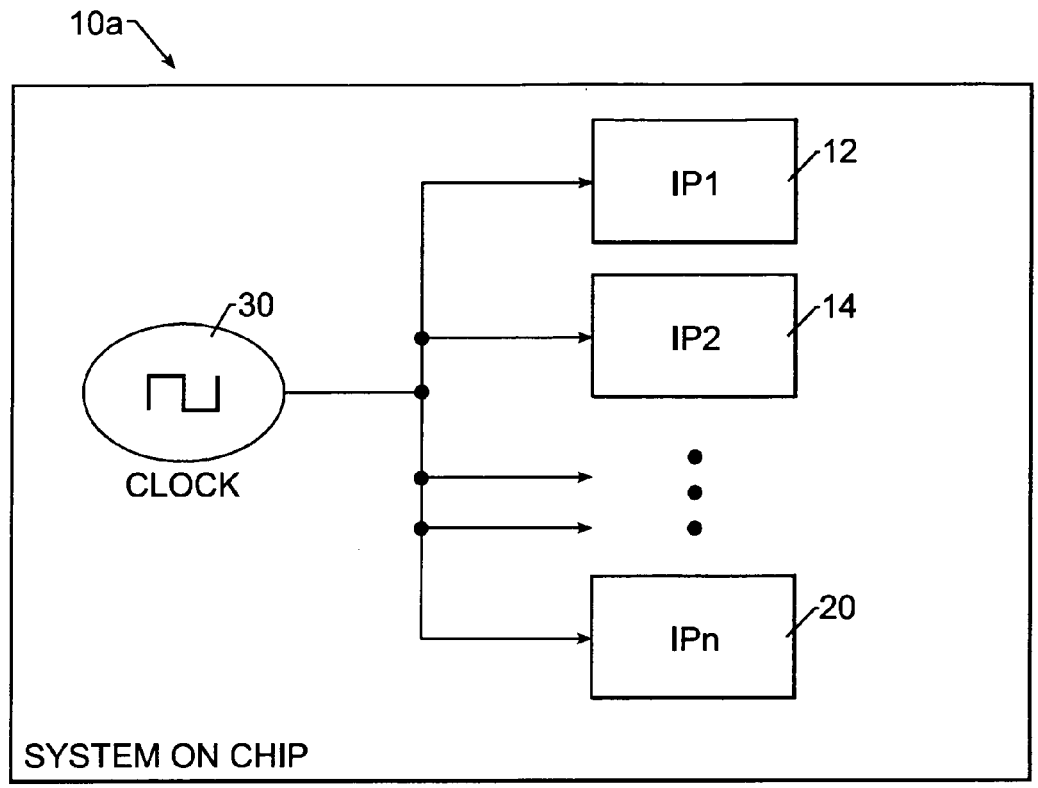
FIG. 1 is a block diagram of a system-on-chip according to the prior art.
Figure 2:
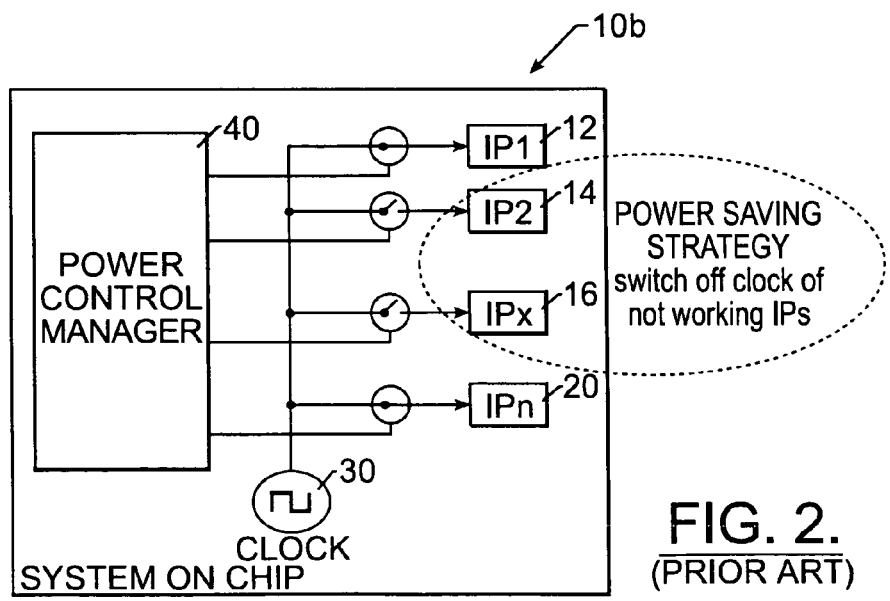
FIG. 2 is a block diagram of a system-on-chip that includes a power control management circuit according to the prior art.
Figure 3:
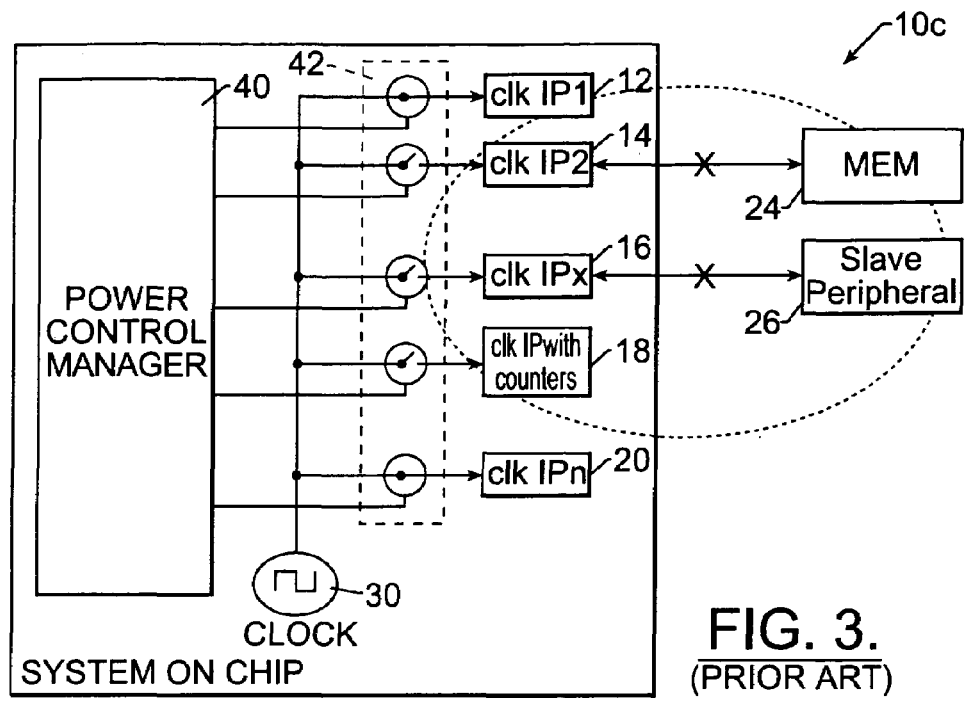
FIG. 3 is a block diagram of a system-on-chip highlighting the problems associated with the power control management circuit illustrated in FIG. 2.
Figure 4:
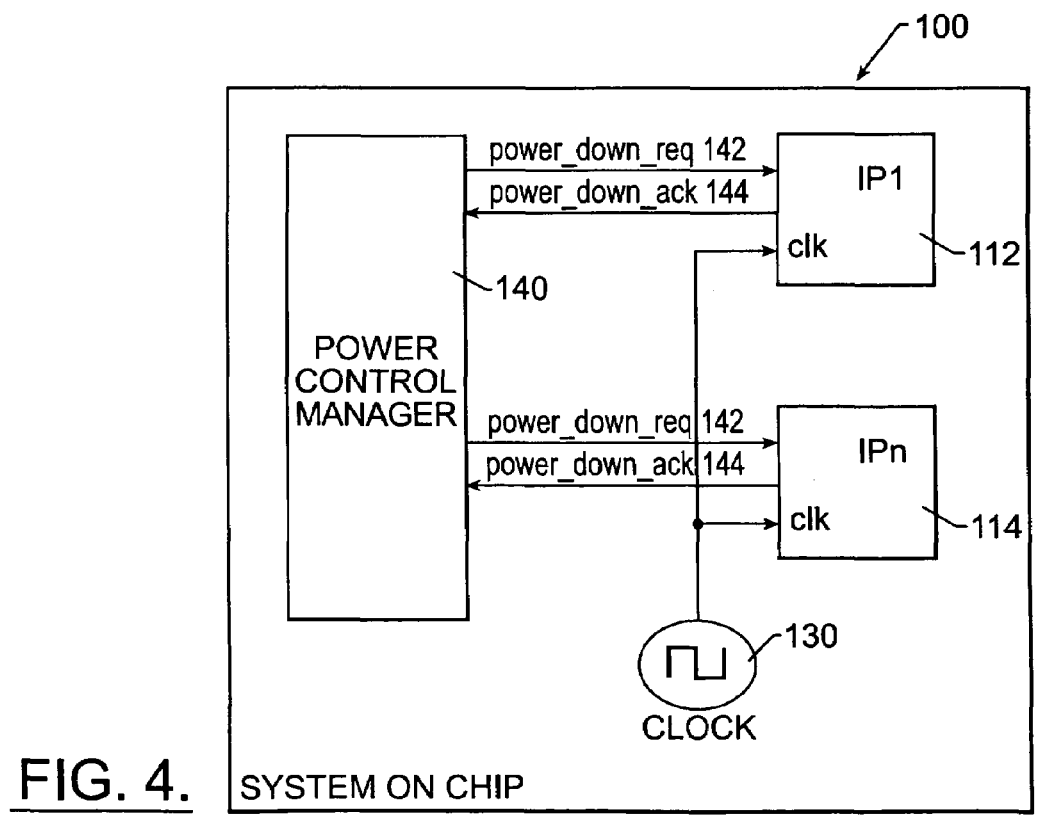
FIG. 4 is a block diagram of a system-on-chip chip including the protocol according to the invention.

FIG. 4 illustrates interconnections that can be used to implement the protocol according to the invention. An SOC 100 includes a system clock 130, a power control manager 140, and two IP blocks 112 and 114. The system clock 130 is provided to each of the IP blocks 112, 114. Additionally, two signal lines couple each IP block 112, 114 to the power control manager 140. The first of these is a power down request line 142, and the second is a power down acknowledgment line 144. Each IP block 112, 114 has its own set of request and acknowledgment lines 142, 144 coupled to the power control manager 140. Of course any number of IP blocks 112, 114, etc. could be included in the SOC 100, with only the addition of the required number of request and acknowledgment lines 142, 144 and the proper connections to the system clock 130 being necessary.

In operation, each IP block 112, 114 receives a "power down request" signal on the power down request line 142. A signal of either a 0 or a 1 is always present on this request line 142. Normally, this signal will be a 0 when the IP blocks 112, 114 are in operation, but the 1 signal could be used instead, and such a change is within the scope of one skilled in the art. For purposes of this description, a 0 signal on the power down request line 142 will indicate that the IP blocks 112, 114 should be operating normally, and a 1 signal on the power down request line 142 will indicate that the IP blocks 112, 114 should be shutdown.

When the power control manager 140 determines that a particular IP block should be shutdown, it puts a 1 signal on the power down request line 142 coupled to the particular IP block. The selected IP block will receive the 1 signal on the request line 142 and finish its necessary operations. Once the operations are complete, the IP block will place a 1 signal on its power down acknowledgment line 144. Placing this signal on the acknowledgment line 144 then causes the system clock 130 to disconnect from a local clock of the IP block, and the IP block stops drawing power.

Figure 5:
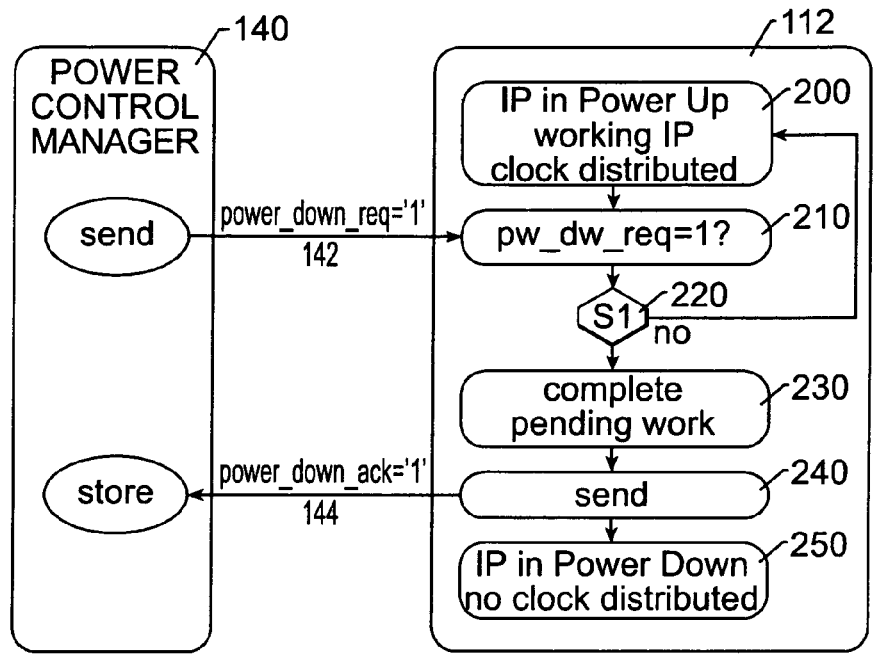
FIG. 5 is a flowchart showing implementation of a first portion of the protocol according to the invention.
Figure 6:
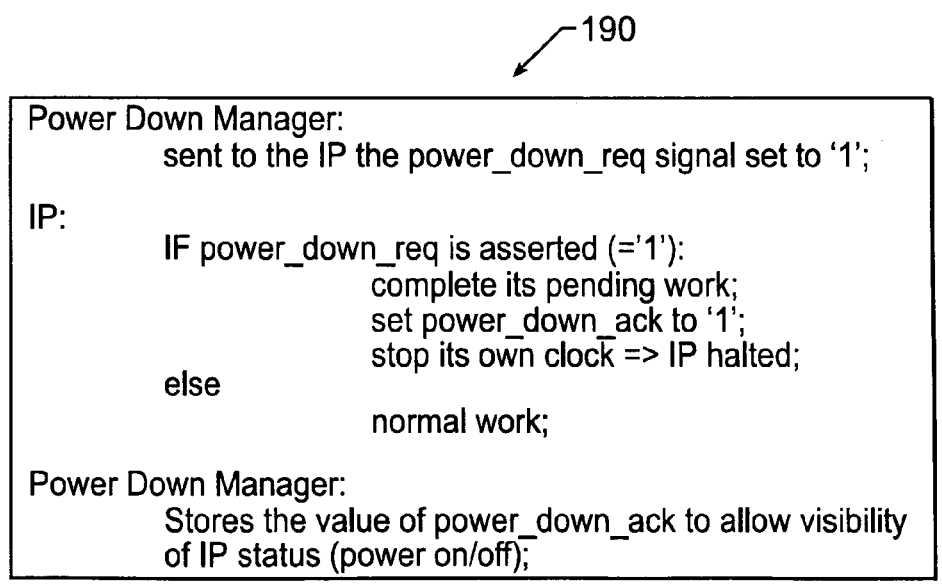
FIG. 6 is a psuedocode listing describing operation of the flowchart illustrated in FIG. 5.

FIGS. 5 and 6 illustrate a flowchart and psuedocode, respectively, explaining operation of an implementation of the power down portion of the protocol. In FIG. 5, the power control manager 140 desires the IP block 112 to stop drawing power, and issues a 1 on the power down request line 142. The IP block 112 begins at step 200 and monitors the signal on the request line 142 in step 210. If the signal is a 0 in condition block 220, the IP block 112 continues looping through the steps 200, 210 and 220 until the signal on the request line 142 changes to a 1.

When the step 210 recognizes that the signal on the request line 142 has changed to a 1, it proceeds to step 230 where all of the necessary operations that are pending in the IP block 112 are completed. Once these operations are completed, the IP block 112 changes the signal on the power down acknowledgment line 144 from a 0 to a 1 in step 240, and ceases to function in step 250. The 1 signal on the acknowledgment line 144 is sensed by the power control manager 140. In the powered down state of step 250, the IP block 112 does not draw any power from the SOC 100. The psuedocode 190 of FIG. 6 explains the above paragraph.

Figure 7:
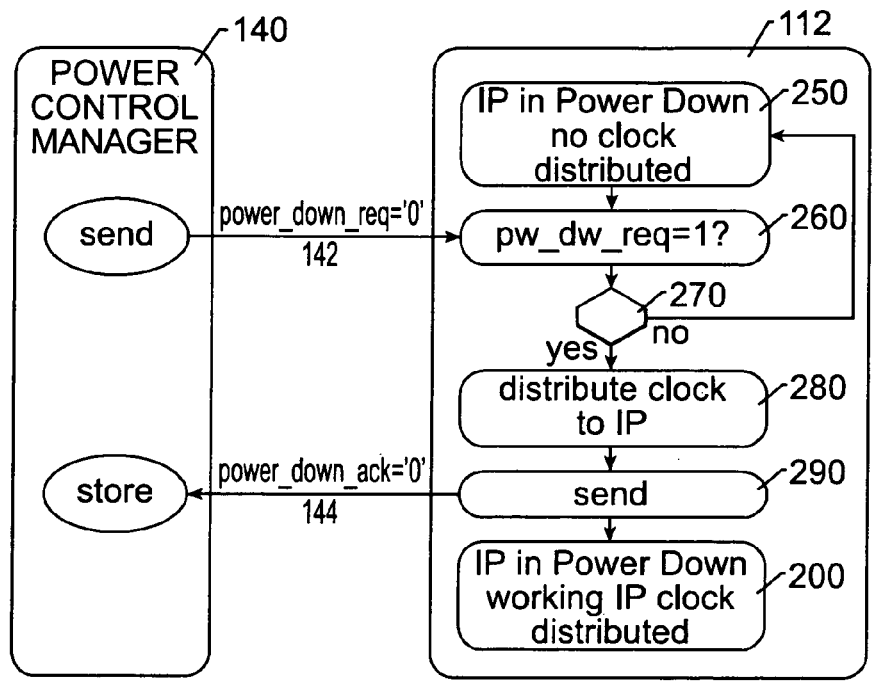
FIG. 7 is a flowchart showing implementation of a second portion of the protocol according to the invention.
Figure 8:
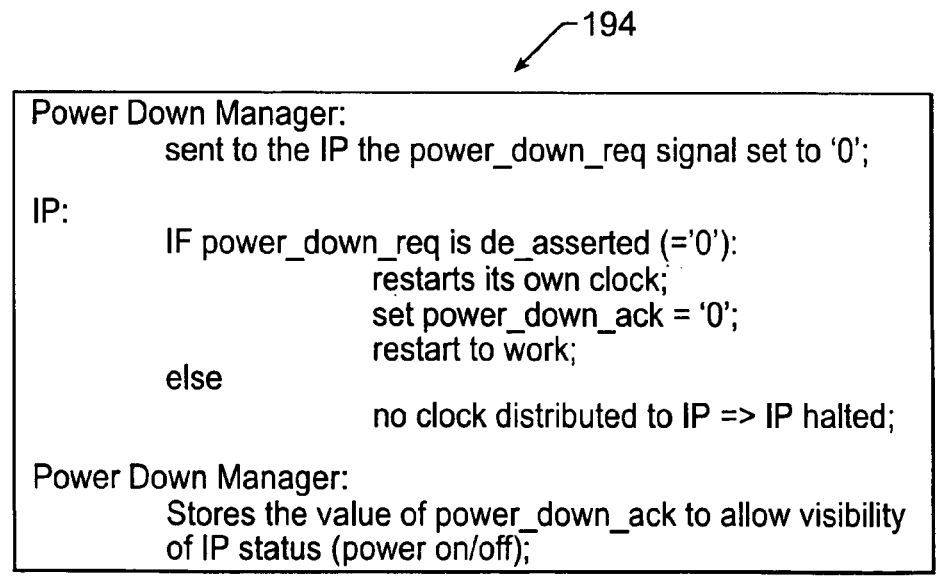
FIG. 8 is a psuedocode listing describing operation of the flowchart illustrated in FIG. 7.

FIGS. 7 and 8 conversely show how the protocol operates as the IP block 112 is restarted after being shutdown. The IP block 112 begins in the state 250, the powered down state is also shown in FIG. 5, and immediately reads the request line 142 in step 260 and begins checking in step 270 to see if the signal on the request line 142 goes from a 1 to a 0. This indicates that the IP block 112 is to restart. Once the request line goes from a 1 to a 0, the system clock 130 (FIG. 4) is again distributed to the IP block 112 in step 280, and the IP block changes the signal on the acknowledgment line 144 from a 1 to a 0 in step 290. After this step, the IP block 112 proceeds back to the step 200, which is the normal operating step that the IP block started at in FIG. 5. The psuedocode 194 of FIG. 8 corresponds to the flowchart shown in FIG. 7, and is self-explanatory.

The state of the request line 142 and the acknowledgment line 144 are stored in the power control manager 140. By evaluating the stored states, the power control manager 140 can determine with certainty which state any given IP block is in, as illustrated in the following Table 1.

TABLE 1

| 142 Request Line | 144 Ack Line | Status of IP block |
|---|---|---|
| 0 | 0 | Currently running |
| 1 | 0 | Currently shutting down |
| 1 | 1 | Shutdown |
| 0 | 1 | Restarting |

When both the request line 142 and the acknowledgment line 144 are both at a 0, the IP block would be operating normally. When the request line 142 goes to a 1 while the acknowledgment line 144 remains at a 0, that indicates that the IP block has just been instructed to shutdown, but is still finishing its required tasks before doing so. When both the request line 142 and the acknowledgment line 144 are at a 1, the IP block has shutdown and sends the acknowledgment of such back to the power control manager by placing a 1 on the acknowledgment line 144. Finally, when the request line 142 goes to a 0 while the acknowledgment line 144 remains at a 1, the IP block will restart operations.

Figure 9:
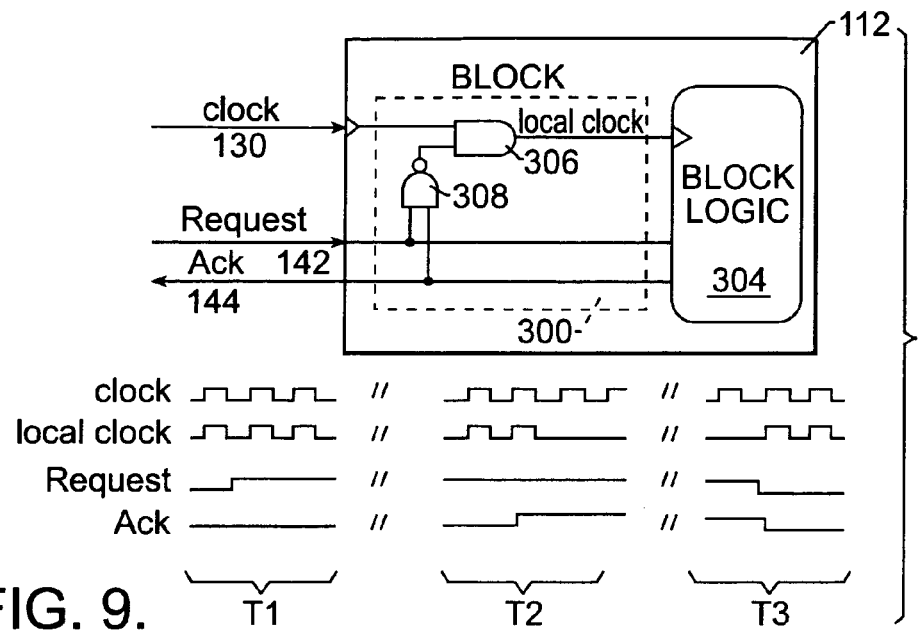
FIG. 9 is a block diagram and a related timing diagram showing operation of selected signals within a system-on-chip including the protocol according to the invention.

FIG. 9 shows a block diagram of an example IP block 112, along with a related timing diagram showing sample clock waveforms as they exist in the SOC 100 of FIG. 4. Included within the IP block 112 of FIG. 9 is a set of block logic 304, which is specific to the type of circuit contained within the IP block 112. Additionally within the IP block 112 is a shutdown circuit 300, which in one example can include a set of logic gates 306 and 308. In this particular embodiment of the shutdown circuit 300, the logic gate 306 is an AND gate and the logic gate 308 is a NAND gate, although any combination of logic gates that produce the correct result is acceptable for the shutdown circuit 300, and is within the scope of the invention.

In FIG. 9, the NAND gate 308 has a first input connected to the request line 142, and a second input connected to the acknowledgment line 144. An output signal from the NAND gate 308 is a first input to the AND gate 306, with the system clock 130 being a second input. The output of the AND gate 306 is a local clock signal 310, which is fed to the block logic 304. As illustrated in FIG. 9, the local clock will have the same frequency as the system clock 130, but will only be present when the output signal from the NAND gate 308 is a 1 signal.

Examples of signals feeding the shutdown circuit 300 are also shown in FIG. 9 for three different time periods t1, t2 and t3. In all of the time periods t1, t2 and t3, the system clock 130 continues to operate at the system frequency. In the first time period t1, the request line 142 changes from a 0 to a 1. This indicates that the power management system 140 of FIG. 4 desires the IP block 112 to be shutdown. The IP block 112 begins to shutdown at the end of the period t1, which correlates with the step 230 shown in FIG. 5. Because the acknowledgment line 144 is still set to a 0 throughout the entire period t1, the local clock 310 would continue to be supplied to the block logic 304 during the entire period t1.

In the period t2, the IP block 112 completes its current operations and raises the acknowledgment line 144 from a 0 to a 1. Once this occurs, the output of the NAND gate 308 goes LOW, and therefore the output of the AND gate 306 also goes LOW. This causes the local clock 310 to stop, and the IP block 112 is in a powered down mode.

In the period t3, the request line 142 changes from a 1 to a 0, indicating that the power control block 140 desires that the IP block 112 restart its operations. When the signal on the request line 142 changes from a 1to a 0, the output of the NAND gate 308 immediately (after a negligible propagation delay) changes from a 0 to a 1. This, in turn, causes the AND gate 306 to again pass the system clock 130 as its output for the local clock 310, which is again fed to the block logic 304. Once the local clock 310 is present within the block logic 304, the IP block 112 lowers the acknowledgment line 144 from a 1 to a 0, indicating that it has resumed operation.

Figure 10:
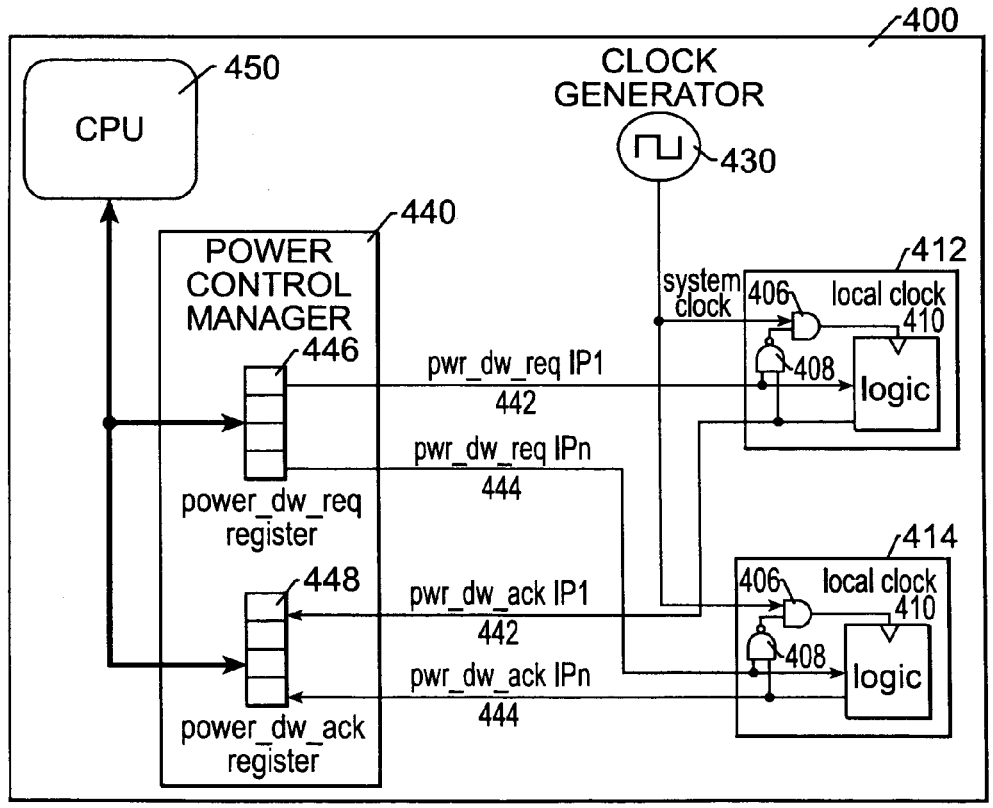
FIG. 10 is a block diagram showing implementation of portions of a complete system-on-chip including the protocol according to the invention.

FIG. 10 shows a top level architecture implementation of the protocol according to the invention. An SOC 400 includes IP blocks 412 and 414. Again, any number of IP blocks could be present within the SOC 400, and only two are shown for purposes of illustration. A system clock 430 is always in operation within the SOC 400, and is distributed as a first input to an AND gate 406 within each of the IP blocks 412, 414. Another input to the AND gate 406 is an output from a NAND gate 408, also present in each IP block. The NAND gate 408 has a first input from a power down request line 442, and a second input from a power down acknowledgment line 444. When the signals on the request line 442 and the acknowledgment line 444 are both 1's, a local clock 410 is not passed to the respective block logic within the IP blocks 412, 414. Otherwise, the local clock 410 is the same as the system clock 430, as discussed above.

The power control manager 440 includes a set of two registers, a first register 446 and a second register 448. These registers each contain memory storage locations, at least one location for each IP block 412, 414 within the SOC 400. The first register 446 is coupled to all of the power down request lines 442 in the entire SOC 400. That is, each of the power down request lines 442 will have a 0 or a 1 signal on it determined by the data stored in the respective memory location of the first register 446. Providing data on a signal line, such as the request line 442 to match data stored in a memory location, and reading data from a signal line and storing it in a memory location are conventionally known.

In one embodiment, a CPU 450 can write data into the particular memory location of the first register 446 for a particular IP block within the SOC 400, and the power down request line 442 will be changed accordingly. In another embodiment, the CPU 450 would not be allowed to write data into the first register 446, but could only read data already written there by the power control manager 450. In still another embodiment, programmable control would be given where it could be selected whether the power control manager 440 or the CPU 450, or both, could write data into the first register, thereby controlling the shutdown of the relative IP block.

The second register 448 is coupled to all of the power down acknowledgment lines 444 in the entire SOC 400. Each of the power down acknowledgment lines 444 will have a 0 or a 1 signal on it determined by the signal placed on the acknowledgment line 444 by the respective IP block 412, 414. Because only the IP block itself can change the signal on the acknowledgment line 444, neither the power control manager 440 or the CPU 450 can write data into the second register 448, but both of them can read the data stored there.

An advantage to implementing the inventive protocol in the manner shown in FIG. 10 is that the power control manager 440 and the CPU 450 always knows the current states of the IP blocks 412, 414 in the SOC 400 by comparing the data stored in the particular locations of the first and second registers 446, 448 that denote the respective IP blocks, and comparing the data read from the registers to the table provided above.

This protocol provides a straightforward and convenient way to safely switch off the clock to desired circuits within a system-on-chip by providing a signal to the desired circuits and letting them finish their processing prior to being shut down. The implementation described above provides a further benefit in that control of such shutdowns can be executed by hardware and/or by software.

That which is claimed is:

1. A system-on-chip (SOC) comprising:
a plurality of circuit blocks, each responsive to a respective local clock signal;
a system clock connected to said circuit blocks for providing a system clock signal thereto for functioning as the respective local clock signals;
a power control manager connected to said circuit blocks for selectively providing a shutdown signal thereto;
each circuit block comprising a shutdown circuit for preventing the system clock signal from functioning as the respective local clock signal after the circuit block receiving the shutdown signal provides a shutdown acknowledgment signal to said power control manager;
said power control manager being connected to each shutdown circuit through a respective power down request line for providing the shutdown signal thereto, and through a respective power down acknowledgment line for receiving the shutdown acknowledgment signal therefrom, said power control manager comprising
a first register connected to the respective power down request lines for storing data indicating logic states of the shutdown signals, and
a second register connected to the respective power down acknowledgment lines for storing data indicating logic states of the shutdown acknowledgment signals; and
a central processing unit connected to said power control manager for determining whether each circuit block is in an active state or an idle state by querying said first and second registers.

2. An SOC according to claim 1, wherein each shutdown circuit comprises a clock separation circuit connected to said power control manager for preventing the system clock signal from functioning as the respective local clock signal if said corresponding circuit block receiving the shutdown signal is in an idle state.

3. An SOC according to claim 1, wherein each circuit block further comprises a block logic circuit connected to said shutdown circuit through the respective power down request line for receiving the shutdown signal therefrom, and through the respective power down acknowledgment line for providing the shutdown acknowledgment signal thereto.

4. An SOC according to claim 1, wherein each shutdown circuit comprises a logic circuit having a first input connected to the respective power down request line, a second input connected to the respective power down acknowledgment line, and a third input connected to said system clock, and an output for providing the respective local clock signal based upon logic states of the shutdown signal, the shutdown acknowledgment signal and the system clock signal.

5. An SOC according to claim 1, further comprising another system clock connected to selected circuit blocks for providing a system clock signal thereto.

6. A system-on-chip (SOC) comprising:
a plurality of circuit blocks;
a system clock connected to said circuit blocks for providing a system clock signal thereto;
a power control manager connected to said circuit blocks for selectively providing a shutdown signal thereto; and
each circuit block comprising
a block logic circuit having an input for receiving the shutdown signal, and an output for providing a shutdown acknowledgment signal to said power control manager after receiving the shutdown signal, and
a shutdown circuit connected to said block logic circuit for preventing the system clock signal from functioning as a local clock signal after said block logic circuit provides the shutdown acknowledgment signal to said power control manager;
said power control manager being connected to each shutdown circuit through a respective power down request line for providing the shutdown signal thereto, and through a respective power down acknowledgment line for receiving the shutdown acknowledgment signal therefrom, said power control manager comprising
a first register connected to the respective power down request lines for storing data indicating logic states of the shutdown signals, and
a second register connected to the respective power down acknowledgment lines for storing data indicating logic states of the shutdown acknowledgment signals; and
central processing unit connected to said power control manager for determining whether each circuit block is in an active state or an idle state by querying said first and second registers.

7. An SOC according to claim 6, wherein each shutdown circuit comprises a clock separation circuit connected to said power control manager for preventing the system clock signal from functioning as the local clock signal if said corresponding circuit block receiving the shutdown signal is in an idle state.

8. An SOC according to claim 6, wherein each block logic circuit is connected to said shutdown circuit through the respective power down request line for receiving the shutdown signal therefrom, and through the respective power down acknowledgment line for providing the shutdown acknowledgment signal thereto.

9. An SOC according to claim 6, wherein each shutdown circuit comprises a logic circuit having a first input connected to the respective power down request line, a second input connected to the respective power down acknowledgment line, and a third input connected to said system clock, and an output for providing the local clock signal based upon logic states of the shutdown signal, the shutdown acknowledgment signal and the system clock signal.

10. A method for powering down circuit blocks within a system-on-chip (SOC) comprising a plurality of circuit blocks, and a power control manager, the method comprising:
providing a system clock signal to the circuit blocks for functioning as a respective local clock signal;
selectively providing a shutdown signal from the power control manager to the circuit blocks;

preventing the system clock signal from functioning as the respective local clock signal after the circuit block receiving the shutdown signal provides a shutdown acknowledgment signal;

each circuit block comprising a shutdown circuit connected to the power control manager through a respective power down request line for receiving the shutdown signal therefrom, and through a respective power down acknowledgment line for providing the shutdown acknowledgment signal thereto;

the power control manager comprising a first register connected to the respective power down request lines for storing data indicating logic states of the shutdown signals, and a second register connected to the respective power down acknowledgment lines for storing data indicating logic states of the shutdown acknowledgment signals; and determining whether each circuit block is in an active state or an idle state by querying the first and second registers.

11. A method according to claim 10, further comprising preventing the system clock signal from functioning as the respective local clock signal if the corresponding circuit block receiving the shutdown signal is in an idle state.

12. A method according to claim 10, wherein each circuit block further comprises a block logic circuit connected to the shutdown circuit through the respective power down request line for receiving the shutdown signal therefrom, and through the respective power down acknowledgment line for providing the shutdown acknowledgment signal thereto.

13. A method according to claim 10, wherein each shutdown circuit comprises a logic circuit having a first input connected to the respective power down request line, a second input connected to the respective power down acknowledgment line, and a third input connected to a system clock, and an output for providing the respective local clock signal based upon logic states of the shutdown signal, the shutdown acknowledgment signal and the system clock signal.

* * * * *